（12) United States Patent
Menon et al.

(10) Patent No.: US 11,792,471 B2
(45) Date of Patent: Oct. 17, 2023

(54) AIRCRAFT WIRELESS SPEAKER PAIRING MANAGEMENT WITH MULTIPLE PAIRING TRANSMITTERS

(71) Applicant: Gulfstream Aerospace Corporation, Savannah, GA (US)

(72) Inventors: Preeti Menon, Savannah, GA (US); Kristin Medin, Savannah, GA (US); Kamen Kostov, Savannah, GA (US); Zachary Grether, Savannah, GA (US); Melissa Curtis, Savannah, GA (US)

(73) Assignee: Gulfstream Aerospace Corporation

( * ) Notice: Subject to any disclaimer, the term of this patent is extended or adjusted under 35 U.S.C. 154(b) by 0 days.

(21) Appl. No.: 17/448,687

(22) Filed: Sep. 23, 2021

(65) Prior Publication Data

US 2023/0088236 A1    Mar. 23, 2023

(51) Int. Cl.
*H04N 21/436* (2011.01)
*H04N 21/214* (2011.01)
*H04N 21/431* (2011.01)
*H04R 1/10* (2006.01)
*H04R 3/12* (2006.01)
*H04W 76/10* (2018.01)
*G06F 16/25* (2019.01)
*H04N 21/4363* (2011.01)

(52) U.S. Cl.
CPC ....... *H04N 21/43637* (2013.01); *G06F 16/25* (2019.01); *H04N 21/2146* (2013.01); *H04N 21/431* (2013.01); *H04R 1/1041* (2013.01); *H04R 3/12* (2013.01); *H04W 76/10* (2018.02); *H04R 2420/07* (2013.01)

(58) Field of Classification Search
CPC ......... H04N 21/43637; H04N 21/2146; H04N 21/431; H04R 1/1041; H04R 3/12; H04R 2420/07; H04W 76/10; G06F 16/25
USPC .......................................................... 725/76
See application file for complete search history.

(56) References Cited

U.S. PATENT DOCUMENTS

| 10,530,466 | B1 * | 1/2020 | Sato ..................... G06V 40/172 |
| 10,685,497 | B1 * | 6/2020 | Ball ...................... G06T 19/006 |
| 10,834,296 | B2 | 11/2020 | Maker, III |
| 11,492,119 | B1 * | 11/2022 | Watson ............ H04N 21/25891 |
| 2007/0044126 | A1 | 2/2007 | Mitchell |

(Continued)

*Primary Examiner* — Dominic D Saltarelli
(74) *Attorney, Agent, or Firm* — LKGlobal | Lorenz & Kopf, LLP

(57) ABSTRACT

An aircraft includes a video display, first and second wireless pairing transmitters, and a media distribution processor. The video display is associated with an audio content stream and a seating location in the aircraft. The first wireless pairing transmitter is associated with the video display and has a first wireless coverage volume. The second wireless pairing transmitter has a second wireless coverage volume that overlaps the first wireless coverage volume. The media distribution processor is programmed and configured to: associate a wireless speaker device with the seating location; pair the first wireless pairing transmitter with the wireless speaker device in response to associating the wireless speaker device with the seating location; and direct the audio content stream through the first wireless pairing transmitter to the wireless speaker device in response to connecting the first wireless pairing transmitter with the wireless speaker device.

23 Claims, 5 Drawing Sheets

(56) References Cited

U.S. PATENT DOCUMENTS

| | | | |
|---|---|---|---|
| 2012/0291102 A1* | 11/2012 | Cohen | G06F 21/57 |
| | | | 726/4 |
| 2015/0017915 A1 | 1/2015 | Hennequin et al. | |
| 2016/0021158 A1* | 1/2016 | Donaldson | H04R 1/1041 |
| | | | 709/203 |
| 2016/0071395 A1 | 3/2016 | Demeniuk et al. | |
| 2021/0291985 A1* | 9/2021 | Chen | H04N 21/25883 |
| 2022/0286360 A1* | 9/2022 | Gali | H04L 41/40 |
| 2023/0078717 A1* | 3/2023 | Mikulak | H04B 11/00 |
| | | | 455/41.3 |

* cited by examiner

AIRCRAFT WIRELESS SPEAKER PAIRING MANAGEMENT WITH MULTIPLE PAIRING TRANSMITTERS

TECHNICAL FIELD

Embodiments of the present invention generally relate to aircraft wireless speaker pairing management with multiple pairing transmitters, and more particularly relate to aircraft systems that identify a seat location of a wireless speaker to direct audio content to the wireless speaker through a pairing transmitter based on the seat location.

BACKGROUND OF THE INVENTION

Modern business aircraft typically include a well-appointed passenger cabin for the safety and comfort of aircraft passengers. The passenger cabin typically includes a complex in-flight entertainment ecosystem that requires crew and passengers to make multiple decisions about what to watch, what to listen to (can be different from what's being watched), where to watch, and what to listen through.

The inclusion of a pairing-type wireless transfer of audio signals from a personal electronic device to the cabin or from the cabin to a personal wireless device may be provided in the cabin. A pairing-type wireless headset offers comfort and personalization to the passenger but adds more complexity to the operation of the in-flight entertainment system. Unlike the other input sources which are hard-wired into the cabin in-flight entertainment system, the opportunity to dynamically connect any personal device (computer, laptop, tablet, smart phone) to an Audio Video Distribution System (AVDS) as well as dynamically pair and connect a pairing-type headset or earbuds to any onboard/hard-wired entertainment source (including but not limited to satellite television, BLU-RAY, APPLE TV, KALEIDESCAPE, XM RADIO, etc.) can become vastly overwhelming and complicated to manage as there are a multitude of pairing transmitters and receivers and an unpredictable amount of personal devices engaged at any given time.

Accordingly, it is desirable to provide an aircraft environment with a system that offers passenger(s) the ability to manage pairing wireless speakers with multiple transmitters. Other desirable features and characteristics will become apparent from the subsequent summary and detailed description and the appended claims, taken in conjunction with the accompanying drawings and the foregoing technical field and background.

SUMMARY

The disclosed embodiments relate to aircraft wireless speaker pairing management with multiple pairing transmitters.

In a first non-limiting embodiment, an aircraft includes a video display, first and second wireless pairing transmitters, and a media distribution processor. The video display is associated with an audio content stream and a seating location in the aircraft. The first wireless pairing transmitter is associated with the video display and has a first wireless coverage volume. The second wireless pairing transmitter has a second wireless coverage volume that overlaps the first wireless coverage volume. The media distribution processor is programmed and configured to: associate a wireless speaker device with the seating location; pair the first wireless pairing transmitter with the wireless speaker device in response to associating the wireless speaker device with the seating location; and direct the audio content stream through the first wireless pairing transmitter to the wireless speaker device in response to connecting the first wireless pairing transmitter with the wireless speaker device.

In a second non-limiting embodiment, an aircraft media distribution system is for an aircraft having a seating location. The aircraft media distribution system includes a video display, first and second wireless pairing transmitters, and a media distribution processor. The video display is associated with an audio content stream and a seating location in the aircraft. The first wireless pairing transmitter is associated with the video display and has a first wireless coverage volume. The second wireless pairing transmitter has a second wireless coverage volume that overlaps the first wireless coverage volume. The media distribution processor is programmed and configured to: associate a wireless speaker device with the seating location; pair the first wireless pairing transmitter with the wireless speaker device in response to associating the wireless speaker device with the seating location; and direct the audio content stream through the first wireless pairing transmitter to the wireless speaker device in response to connecting the first wireless pairing transmitter with the wireless speaker device.

In a third non-limiting embodiment, a method is for managing paired devices in an aircraft having a media distribution system and a seating location, the media distribution system having: a video display associated with an audio content stream and a seating location in the aircraft; a first wireless pairing transmitter associated with the video display and having a first wireless coverage volume; a second wireless pairing transmitter having a second wireless coverage volume that overlaps the first wireless coverage volume; and a media distribution processor. The method includes associating, by the media distribution processor, a wireless speaker device with the seating location. The method further includes pairing the first wireless pairing transmitter with the wireless speaker device in response to associating the wireless speaker device with the seating location. The method further yet includes directing the audio content stream through the first wireless pairing transmitter to the wireless speaker device in response to connecting the first wireless pairing transmitter with the wireless speaker device.

DESCRIPTION OF THE DRAWINGS

Embodiments of the present invention will hereinafter be described in conjunction with the following drawing figures, wherein like numerals denote like elements.

DESCRIPTION OF EXEMPLARY EMBODIMENTS

Figure 1:
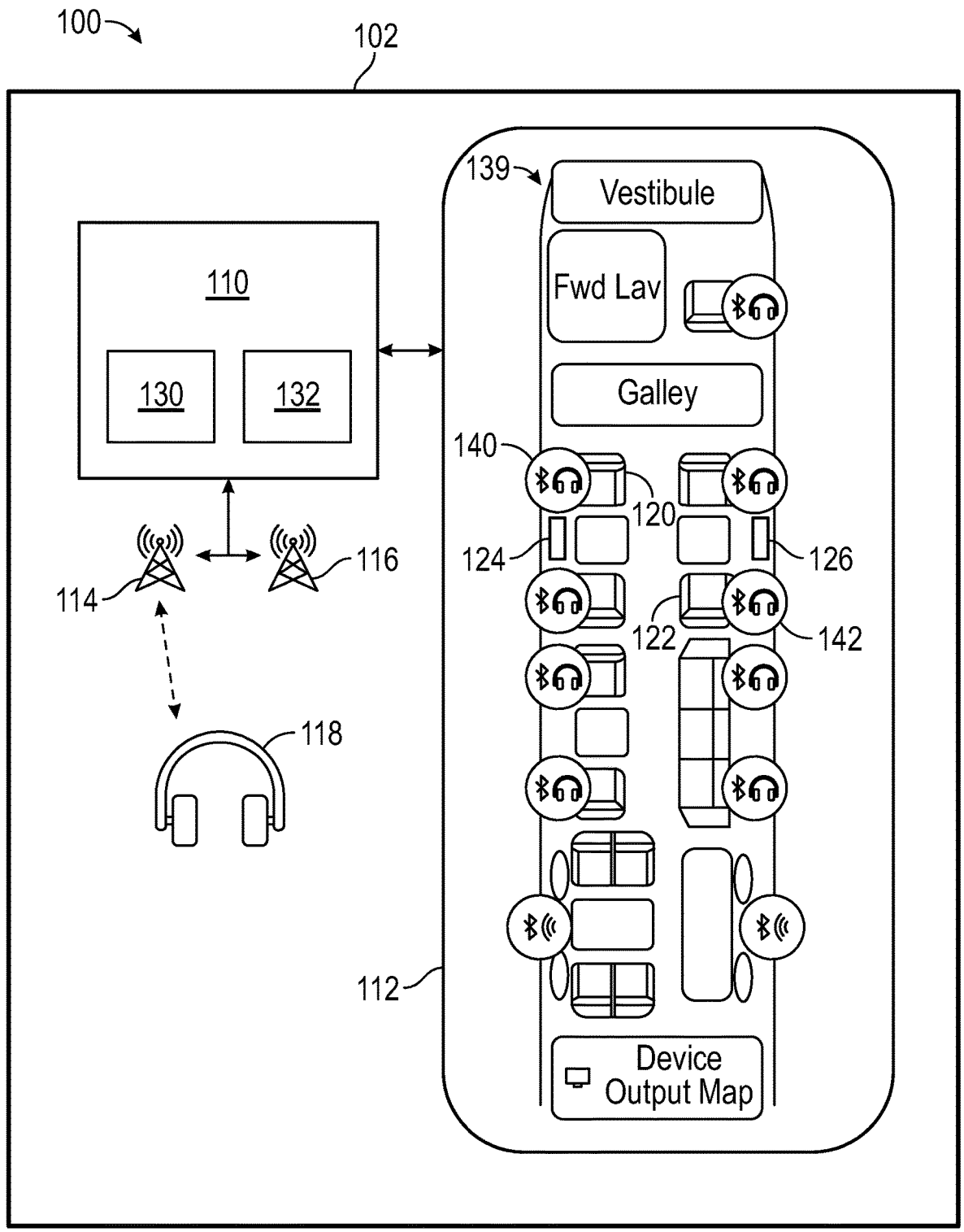
FIG. 1 is a schematic view of an aircraft with a media processor accordance with a non-limiting embodiment.

As used herein, the word "exemplary" means "serving as an example, instance, or illustration." The following detailed description is merely exemplary in nature and is not intended to limit the invention or the application and uses of the invention. Any embodiment described herein as "exemplary" is not necessarily to be construed as preferred or advantageous over other embodiments. All of the embodiments described in this Detailed Description are exemplary embodiments provided to enable persons skilled in the art to make or use the invention and not to limit the scope of the invention which is defined by the claims. Furthermore, there is no intention to be bound by any expressed or implied theory presented in the preceding technical field, background, brief summary or the following description.

The disclosed embodiments relate to a system and user interface that indicate the unique modalities (personal device, transmitters, and receivers) and combinations of components which can be connected or are active. A graphical user interface which initiates commands and reports human interpretable signals from the multitudes of components included in the in-flight entertainment system and facilitates the role of the pairing components in the handling of a multitude of disparate audio signals through a multitude of disparate audio input and output devices.

In some embodiments, a system includes a multitude of pairing receivers, a multitude of pairing transmitters, and a multitude of passenger devices brought onboard by passengers and crew. The signals to command and report status may be sent from and to a cabin management system to compose a user interface which allows the crew or passenger(s) the ability to perform a variety of tasks. For example, the tasks may include: initiate pairing a headset to a collocated transmitter through a personal electronic device, transmit/broadcast audio to a collocated receiver, manage the audio output source of broadcasted audio signal (i.e., speakers by zone), unpair or disconnect a headset from a collocated transmitter, troubleshoot connection issues/audio quality (by reporting component codec, signal strength, battery level, address), handle audio/video signal latency by resynchronizing feeds to reduce the phenomenon of "lip flap" associated with lip sync issues, monitor status of the transmitters (i.e., what's paired and actively transmitting), maintain a single cabin-wide database of paired headsets to allow one to quickly identify to which transmitter a headset is paired to and if the headset is paired to more than one transmitter, monitor status of specific paired personal pairing-enabled headset or earbuds to which transmitters, monitor connected devices power level, monitor connected device's pairing protocol/codec, monitor transmitter signal strength respective to output device (headset), manage settings for each paired device (i.e., device name, specific transmitter to connect to, and to clear or "forget" the device from system history), clear or "unpair" existing devices, manage transmitter details such as power (in order to simplify passenger connectivity in the cabin or ensure privacy on ground), rename the transmitter, display sourced audio when connected, display sourced media metadata, display address, associated cabin location, codec, firmware, perform a soft reset, perform a factory reset, reset cabin to default configuration of paired headsets, manage Bluetooth transmitter hand-off (as passengers move through the cabin), manage and display receiver details such as devices connected to the receiver, lock or block devices from being sourced to the cabin, allow blocking of specific Bluetooth devices from appearing in the paired device list, allow tagging of certain mobile phones that denotes unique access privileges (i.e., start streaming to cabin speakers automatically without the need to manually source the speakers) and select a device to source audio to the cabin speakers.

FIG. 1 is a schematic view of a pairing management system 100 for an aircraft 102. The pairing management system 100 includes a media processor 110, a display screen 112, a first pairing transmitter 114, a second pairing transmitter 116, and a pairing wireless headset 118. The aircraft 102—as illustrated on display screen 112—includes a first seating location 120, a second seating location 122, a first media viewer 124, and a second media viewer 126.

The media processor 110 includes a video processor 130 and an audio processor 132. The video processor is operatively coupled with the first media viewer 124 and with the second media viewer 126 to stream video content for users in the first seating location 120 and the second seating location 122, respectively. For example, the media processor 110 may stream movies, television shows, short video clips, or any other video or still image content to the media viewers. The media processor 110 may stream the same video content or different video content to each of the media viewers 124, 126. It should be appreciated that many more media viewers may be included in the aircraft 102 without departing from the scope of the present disclosure.

The audio processor 132 is programmed and configured to stream audio content to wired and wireless speakers. The audio content may be associated with the video content generated by the video processor 130 or may be unrelated to the video content. In the example provided, the audio content for the first media viewer 124 is associated with the video content for the first media viewer 124. Similarly, the audio content for the media viewer 126 is associated with the video content for the second media viewer 126.

The display screen 112 shows images and graphical user interfaces. The display screen 112 may be any electronic device, such as a fixed location electronic device or a portable electronic device. In the example provided, the display screen 112 is a fixed location electronic device mounted in a galley for use by the crew to assist passengers attempting to connect wireless headsets. In some embodiments, the display screen is a mobile computing device that contains a software application (commonly referred to as an "app") that in accordance with exemplary embodiments is configured to perform the functions of display screen 112. In some embodiments, the app may be a commercial airline companion app with pre-loaded seat location information according to a purchased ticket for coupling to an associated media viewer in a seatback of a seat in front of the seat location.

In FIG. 1, the display screen 112 presents a cabin layout interface 139 illustrating the first seating location 120, the second seating location 122, a first transmitter selector 140, and a second transmitter selector 142. In the example provided, the first transmitter selector 140 is disposed near the first seating location 120 and the second transmitter selector 142 is disposed near the second seating location 122 in the cabin layout interface 139. In response to selection of the first transmitter selector 140 and detection of a pairing request from the wireless headset 118, the media processor 110 will pair the wireless headset 118 with the first transmitter selector 140. Similarly, in response to selection of the second transmitter selector 142 and detection of a pairing request from the wireless headset 118, the media processor 110 will pair the wireless headset 118 with the second transmitter selector 142. Based on the association of the selected transmitter with one of the media viewers, the media processor 110 will then stream the audio content associated with the associated media viewer to the wireless headset 118.

The first pairing transmitter 114 and the second pairing transmitter 116 are programmed and configured to pair with wireless headset 118. As used herein, the term "pairing" refers to association for potential connection using a bi-directional communication method, such as the BLU- ETOOTH protocol. Because the communication is bi-directional, the first pairing transmitter 114 and second pairing transmitter 116 are often also receivers. As used herein, the term "transmitter" refers to a wireless pairing antennae device that pairs with various devices to primarily transmit content, even though some information is received from the various devices. For example, the wireless headset 118 receives the audio content from the first pairing transmitter 114, but also sends device information such as hardware information back to the first pairing transmitter 114. It should be appreciated that describing a device as a pairing transmitter does not mean that the device cannot also function as a pairing receiver to receive streaming content from other devices. For example, a BLUETOOTH microphone may connect to first pairing transmitter 114 to enable cabin-wide telephone calls or other communication.

The wireless headset 118 is configured to primarily receive the audio content. The wireless headset 118 does not include a display, and therefore is not capable of presenting for the user a graphical list of available transmitters within the aircraft 102. For example, the wireless headset 118 is not a personal computing device that includes a display screen.

Figure 2:
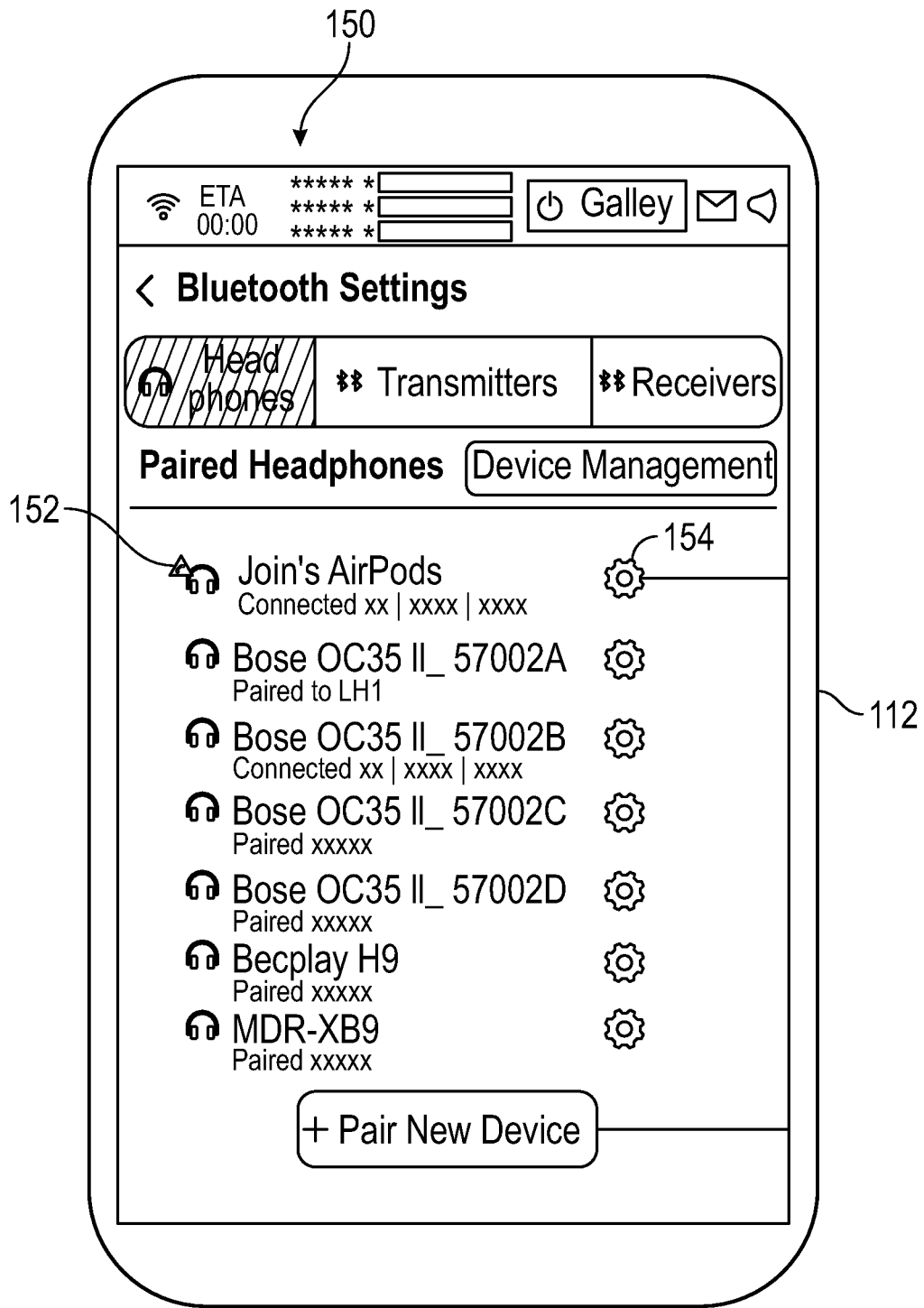
FIGS. 2, 3, and 4 are views of various interfaces generated by the media processor of FIG. 1 in accordance with some embodiments.

Referring now to FIG. 2, and with continued reference to FIG. 1, display screen 112 is illustrating a paired devices interface 150. The paired devices interface indicates each paired headset device. Media processor 110 further generates a multiple pairing indicator 152 in the paired devices interface 150. The multiple pairing indicator 152 expresses to the user that the indicated wireless headset is paired with multiple transmitters that are within range of each other. For example, media processor 110 may maintain a global paired device data structure indicating what devices are paired with each transmitter. In the example provided, the media processor 110 retrieves from each transmitter local data indicating the paired devices. The multiple pairing indicator 152 warns the user that the indicated wireless device may connect with an unintended transmitter. In order to resolve the multiple pairing situation, the user may select the settings selector 154 associated with the indicated device.

Figure 3:
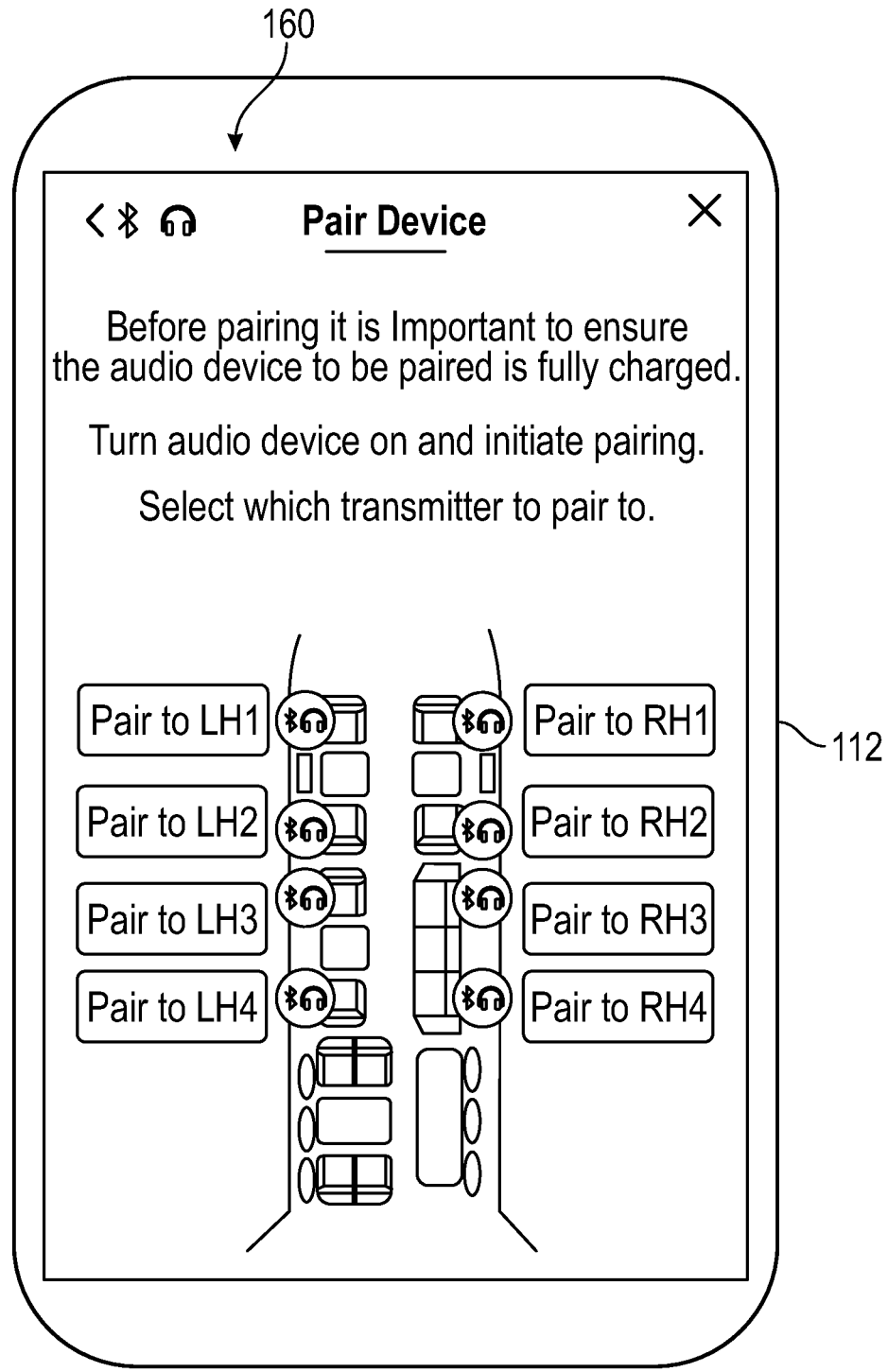

Referring now to FIG. 3, and with continued reference to FIGS. 1-2, display screen 112 is presenting a pairing interface 160. The pairing interface 160 permits the user to select individual transmitters to be paired with the wireless headset 118. For example, the pairing interface 160 may be an alternative to the cabin layout interface 139 for selecting the transmitter to be paired with the wireless headset.

Figure 4:
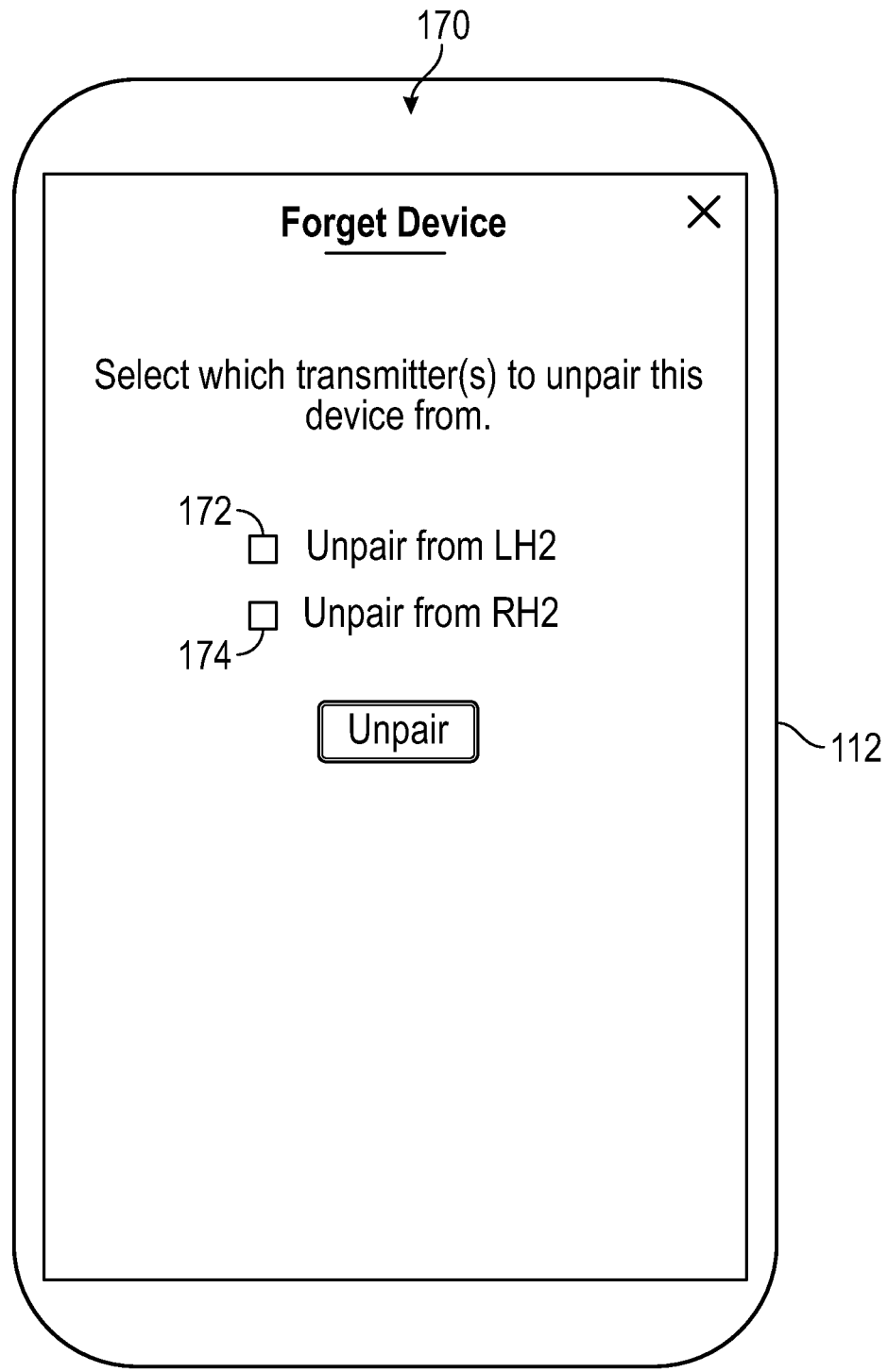

Referring now to FIG. 4, and with continued reference to FIGS. 1-3, display screen 112 is presenting an unpairing interface 170. In the example provided, the media processor 110 generates the unpairing interface 170 in response to selection of the multiple pairing indicator 152 in the paired devices interface 150. The unpairing interface 170 shows that the wireless headset 118 is paired with the first pairing transmitter 114 and the second pairing transmitter 116. The media processor 110 further generates a first unpairing selector 172 and a second unpairing selector 174.

Figure 5:
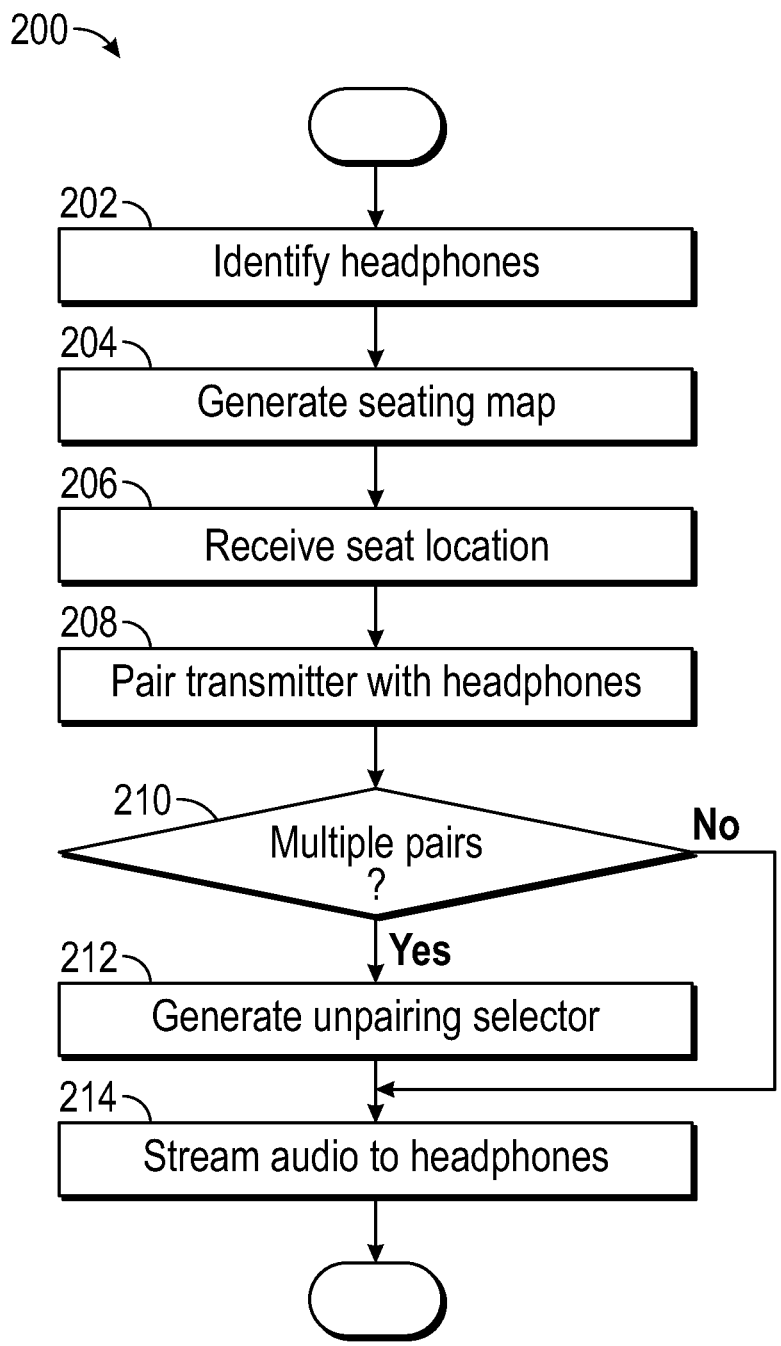
FIG. 5 illustrates a method of managing paired devices with the media processor of FIG. 1 in accordance with some embodiments.

Referring now to FIG. 5, and with continued reference to FIGS. 1-4, a method 200 for managing pairing of a headset in a location with multiple pairing transmitters is illustrated.

Task 202 identifies the headphones. For example, a user of the wireless headset 118 may power on the wireless headset 118 and enter a pairing mode. The first pairing transmitter 114 and the second pairing transmitter 116 receive the pairing signals from the wireless headset 118.

Task 204 generates a seating map. For example, the media processor 110 may generate the cabin layout interface 139 indicating a video display associated with an audio content stream and a seating location in the aircraft.

Task 206 receives a seat location. For example, the media processor 110 may generate a graphical user interface illustrating the seating location, such as in cabin layout interface 139. In some embodiments, the media processor 110 retrieves the seating location information from a personal computing device associated with a user of the seating location, such as from an app on the personal computing device associated with an assigned seat on the aircraft 102.

Task 208 pairs a transmitter with the headphones based on the seat location. In other words, task 208 associates a wireless speaker device with the seating location in response to selection of the seating location by a user of the graphical user interface. Pairing involves identification of the paired components and agreement about their bi-directional communication.

In the example provided, a first wireless pairing transmitter is associated with the video display and has a first wireless coverage volume. A second wireless pairing transmitter has a second wireless coverage volume that overlaps the first wireless coverage volume. In the example provided, the first wireless pairing transmitter and the second wireless pairing transmitter are each disposed within the aircraft such that a pairing range of each of the first wireless pairing transmitter and the second wireless pairing transmitter extends to the seating location. For example, the media processor 110 may pair the wireless headset 118 with the first pairing transmitter 114 or the second pairing transmitter 116.

Task 210 determines whether the headphones are paired with multiple transmitters. In the example provided, the first wireless pairing transmitter has a first paired device database indicating devices that are paired with the first wireless pairing transmitter and the second wireless pairing transmitter has a second paired device database indicating devices that are paired with the second wireless pairing transmitter. The media distribution processor retrieves the first paired device database and the second paired device database and generates a global paired device database indicating the devices that are paired with the first wireless pairing transmitter and the devices that are paired with the second wireless pairing transmitter. For example, the media processor 110 may create a global paired database based on retrieving local databases from the first pairing transmitter 114 and the second pairing transmitter 116.

The media distribution processor is further programmed and configured to generate a graphical user interface indicating that the wireless speaker device is paired with multiple devices in response to identifying the wireless speaker device in the first paired device database and in the second paired device database. For example, the media processor 110 may generate a multiple pairing indicator 152 in the paired devices interface 150.

When the headphones are not paired with multiple transmitters, the method 200 proceeds to task 214. When the headphones are paired with multiple transmitters, the method 200 proceeds to task 212.

Task 212 generates an unpairing selector on the graphical user interface and removes the wireless speaker device from the second paired device database in response to selection of the unpairing selector by a user. For example, the media processor 110 may generate the unpairing interface 170. In some embodiments, the media processor 110 presents the unpairing selector indicating that selection of the unpairing selector will "forget" the paired device. The use of the terms "unpair" and "forget" are used interchangeably herein, where the executed task in response to the selection is to dissolve a previously "paired" relationship between a specific wireless device and transmitter.

Task 214 streams audio to the headphones by connecting the first wireless pairing transmitter with the wireless speaker device in response to associating the wireless speaker device with the seating location. The media distribution processor is further programmed and configured to restrict transmission of the second audio stream to the wireless speaker device in response to associating the wireless speaker device with the first seating location. For example, the media processor 110 may stream audio content from the audio processor 132 to the first media viewer 124 in response to associating the wireless headset 118 with the first seating location 120.

In this document, relational terms such as first and second, and the like may be used solely to distinguish one entity or action from another entity or action without necessarily requiring or implying any actual such relationship or order between such entities or actions. Numerical ordinals such as "first," "second," "third," etc. simply denote different singles of a plurality and do not imply any order or sequence unless specifically defined by the claim language. The process steps may be interchanged in any order without departing from the scope of the invention as long as such an interchange does not contradict the claim language and is not logically nonsensical.

Furthermore, depending on the context, words such as "connect" or "coupled to" used in describing a relationship between different elements do not imply that a direct physical connection must be made between these elements. For example, two elements may be connected to each other through one or more additional elements.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing the exemplary embodiment or similar embodiments. It should be understood that various changes can be made in the function and arrangement of elements without departing from the scope of the disclosure claims and legal equivalents thereof.

The invention claimed is:

1. An aircraft, comprising:
 a plurality of seating locations in the aircraft;
 a plurality of video displays, each of the plurality of video displays associated with at least one seating location in the plurality of seating locations;
 a first wireless pairing transmitter having a first wireless coverage volume in the aircraft;
 a second wireless pairing transmitter having a second wireless coverage volume in the aircraft that at least partially overlaps the first wireless coverage volume; and
 at least one media distribution processor programmed and configured to:
  generate a global paired device database, wherein the global paired device database:
   indicates which of a plurality of wireless speaker devices are paired with the first wireless pairing transmitter;
   indicates which of the plurality of wireless speaker devices are paired with the second wireless pairing transmitter; and
   associates at least one of the plurality of wireless speaker devices with a seating location in the plurality of seating locations in the aircraft; and
  selectively direct an audio content stream to the at least one of the plurality of wireless speaker devices based on the seating location associated with the at least one of the plurality of wireless speaker devices, where the audio content stream is selected to correspond to video being presented on a video display associated with the seating location.

2. The aircraft of claim 1, wherein the at least one media distribution processor is further programmed and configured to generate a graphical user interface, the graphical user interface configured to selectively:
 illustrate the plurality of seating locations in the aircraft;
 illustrate a first pairing selector for initiating pairing of a new wireless speaker device to the first wireless pairing transmitter by a user; and
 illustrate a second pairing selector for initiating pairing of the new wireless speaker device to the second wireless pairing transmitter by the user.

3. The aircraft of claim 2, wherein the at least one media distribution processor is further programmed and configured to generate the graphical user interface to selectively:
 illustrate a settings selector for each of the plurality of wireless speaker devices paired with the first wireless pairing transmitter;
 illustrate a settings selector for each of the plurality of wireless speaker illustrate a settings selector for each of the plurality of wireless speaker devices paired with the second wireless pairing transmitter; and
 wherein each of the settings selectors are configured to facilitate management of an associated wireless speaker device by the user.

4. The aircraft of claim 3, wherein each of the settings selectors are further configured to facilitate managing a device name of the associated wireless speaker device by the user.

5. The aircraft of claim 2, wherein the at least one media distribution processor is further programmed and configured to generate the graphical user interface to selectively:
 illustrate a multiple pairing indicator for each of the plurality of wireless speaker devices paired with both the first wireless pairing transmitter and the second wireless pairing transmitter.

6. The aircraft of claim 5, wherein the at least one media distribution processor is further programmed and configured to generate the graphical user interface to selectively:
 illustrate a first unpairing selector for initiating unpairing of a wireless speaker device from the first wireless pairing transmitter by the user; and
 illustrate a second unpairing selector for initiating unpairing of the wireless speaker device from the second wireless pairing transmitter by the user.

7. The aircraft of claim 2, wherein the at least one media distribution processor is further programmed and configured to generate the graphical user interface to selectively:
 illustrate a listing of the plurality of wireless speaker devices paired with the first wireless pairing transmitter and the plurality of wireless speaker devices paired with the second wireless pairing transmitter.

8. The aircraft of claim 2, wherein the aircraft further includes a fixed display screen in a galley of the aircraft, and wherein the at least one media distribution processor is configured to generate the graphical user interface on the fixed display screen.

9. The aircraft of claim 2, wherein the at least one media distribution processor is configured to generate the graphical user interface on a mobile display screen in the aircraft.

10. The aircraft of claim 2, wherein the at least one media distribution processor is programmed and configured to associate at least one of the plurality of wireless speaker devices with a seating location in the plurality of seating locations in response to a selection of the seating location by the user of the graphical user interface.

11. The aircraft of claim 1, wherein the at least one media distribution processor is programmed and configured to associate at least one of the plurality of wireless speaker devices with a seating location in the plurality of seating locations in response to retrieving seat location information from a personal computing device associated with a user of the seating location.

12. The aircraft of claim 1, wherein the first wireless pairing transmitter has a first paired device database indicating devices that are paired with the first wireless pairing transmitter, and wherein the second wireless pairing transmitter has a second paired device database indicating devices that are paired with the second wireless pairing transmitter, and wherein the at least one media distribution processor is further programmed and configured to retrieve the first paired device database and the second paired device database to generate the global paired device database.

13. The aircraft of claim 1, wherein the plurality of video displays includes at least a first video display and a second video display, and wherein the plurality of seating locations includes at least a first seating location and a second seating location, and wherein the first video display is associated with the first seating location and the second video display is associated with the second seating location, and wherein the at least one media distribution processor is further programmed and configured to:
direct a first audio content stream associated with the first video display to a first wireless speaker device associated with the first seating location in the global paired device database; and
direct a second audio content stream associated with the second video display to a second wireless speaker device associated with the second seating location in the global paired device database.

14. An aircraft media distribution system for an aircraft having a plurality of seating locations and a plurality of video displays, where each of the plurality of video displays is associated with at least one seating location in the plurality of seating locations, the aircraft media distribution system comprising:
a first wireless pairing transmitter having a first wireless coverage volume in the aircraft;
a second wireless pairing transmitter having a second wireless coverage volume in the aircraft that at least partially overlaps the first wireless coverage volume; and
at least one media distribution processor programmed and configured to:
generate a global paired device database, wherein the global paired device database:
indicates which of a plurality of wireless speaker devices are paired with the first wireless pairing transmitter;
indicates which of the plurality of wireless speaker devices are paired with the second wireless pairing transmitter; and
associates at least one of the plurality of wireless speaker devices with a seating location in the plurality of seating locations in the aircraft; and
selectively direct an audio content stream to the at least one of the plurality of wireless speaker devices based on the seating location associated with the at least one of the plurality of wireless speaker devices, where the audio content stream is selected to correspond to video being presented on a video display associated with the seating location.

15. The aircraft media distribution system of claim 14, wherein the at least one media distribution processor is further programmed and configured to generate a graphical user interface, the graphical user interface configured to selectively:
illustrate the plurality of seating locations in the aircraft;
illustrate a first pairing selector for initiating pairing of a new wireless speaker device to the first wireless pairing transmitter by a user; and
illustrate a second pairing selector for initiating pairing of the new wireless speaker device to the second wireless pairing transmitter by the user.

16. The aircraft media distribution system of claim 15, wherein the at least one media distribution processor is further programmed and configured to generate the graphical user interface to selectively:
illustrate a settings selector for each of the plurality of wireless speaker devices paired with the first wireless pairing transmitter;
illustrate a settings selector for each of the plurality of wireless speaker illustrate a settings selector for each of the plurality of wireless speaker devices paired with the second wireless pairing transmitter; and
wherein each of the settings selectors are configured to facilitate management of an associated wireless speaker device by the user.

17. The aircraft media distribution system of claim 16, wherein each of the settings selectors are further configured to facilitate managing a device name of the associated wireless speaker device by the user.

18. The aircraft media distribution system of claim 15, wherein the at least one media distribution processor is further programmed and configured to generate the graphical user interface to selectively:
illustrate a multiple pairing indicator for each of the plurality of wireless speaker devices paired with both the first wireless pairing transmitter and the second wireless pairing transmitter.

19. The aircraft media distribution system of claim 18, wherein the at least one media distribution processor is further programmed and configured to generate the graphical user interface to selectively:
illustrate a first unpairing selector for initiating unpairing of a wireless speaker device from the first wireless pairing transmitter by the user; and
illustrate a second unpairing selector for initiating unpairing of the wireless speaker device from the second wireless pairing transmitter by the user.

20. The aircraft media distribution system of claim 15, wherein the at least one media distribution processor is further programmed and configured to generate the graphical user interface to selectively:
illustrate a listing of the plurality of wireless speaker devices paired with the first wireless pairing transmitter and the plurality of wireless speaker devices paired with the second wireless pairing transmitter.

21. The aircraft media distribution system of claim 15, wherein the at least one media distribution processor is programmed and configured to associate at least one of the plurality of wireless speaker devices with a seating location in the plurality of seating locations in response to a selection of the seating location by the user of the graphical user interface.

22. The aircraft media distribution system of claim 14, wherein the at least one media distribution processor is programmed and configured to associate at least one of the plurality of wireless speaker devices with a seating location in the plurality of seating locations in response to retrieving seat location information from a personal computing device associated with a user of the seating location.

23. The aircraft media distribution system of claim 14, wherein the plurality of video displays includes at least a first video display and a second video display, and wherein the plurality of seating locations includes at least a first seating location and a second seating location, and wherein the first video display is associated with the first seating location and the second video display is associated with the second seating location, and wherein the at least one media distribution processor is further programmed and configured to:

direct a first audio content stream associated with the first video display to a first wireless speaker device associated with the first seating location in the global paired device database; and direct a second audio content stream associated with the second video display to a second wireless speaker device associated with the second seating location in the global paired device database.

\* \* \* \* \*

UNITED STATES PATENT AND TRADEMARK OFFICE
CERTIFICATE OF CORRECTION

PATENT NO. : 11,792,471 B2
APPLICATION NO. : 17/448687
DATED : October 17, 2023
INVENTOR(S) : Preeti Menon et al.

Page 1 of 1

It is certified that error appears in the above-identified patent and that said Letters Patent is hereby corrected as shown below:

In the Claims

In Claim 3, Column 8, Lines 32-35 "illustrate a settings selector for each of the plurality of wireless speaker illustrate a settings selector for each of the plurality of wireless speaker devices paired with the second wireless pairing transmitter; and" should be --illustrate a settings selector for each of the plurality of wireless speaker devices paired with the second wireless pairing transmitter; and--.

In Claim 16, Column 10, Lines 33-36 "illustrate a settings selector for each of the plurality of wireless speaker illustrate a settings selector for each of the plurality of wireless speaker devices paired with the second wireless pairing transmitter; and" should be --illustrate a settings selector for each of the plurality of wireless speaker devices paired with the second wireless pairing transmitter; and--.

Signed and Sealed this
Eighth Day of October, 2024

Katherine Kelly Vidal
*Director of the United States Patent and Trademark Office*